Patented Nov. 12, 1935

2,021,059

UNITED STATES PATENT OFFICE 2,021,059

IMPRESSION MATERIAL

Laurence E. Harrison, Long Beach, Calif., assignor to Oramold Products Corporation, West Hollywood, Calif., a corporation of Nevada No Drawing. Application August 22, 1933, Serial No. 686,251

7 Claims. (Cl. 18—47)

This invention relates to an impression or molding material suitable for use by dentists or dental technicians in making impressions of the teeth and gums, and which may also be used for other purposes such as the making of impressions or molds of any desired object in order to permit castings to be made which accurately reproduce the shape and surface detail of such object.

More particularly, the invention relates to a material having plastic characteristics when heated or warmed to a temperature somewhat above atmospheric temperature, in which plastic condition it may be molded or pressed into contact with the object to be molded, as in the making of detailed dental impressions, or the like, and which becomes set upon chilling below a certain temperature, so as to retain the molded shape. In the set condition the material is no longer susceptible to plastic deformation but retains a certain characteristic of resilience so as to permit it to give or yield when pulled from the model, thus, in dental application, permitting the removal of undercut portions of an impression or inverted wedges by a resilient non-plastic deformation of the material, which deformation is overcome by the natural resilience of the material after removal of the deforming stress, so that the impression will return or spring back to its original position after it has been removed, whereby perfect reproduction of the original structure may be obtained.

The present application is a continuation in part of my co-pending application Ser. No. 675,461, filed June 12, 1933, for "Plastic impression material" in which I have described a plastic composition comprising an intimate mixture of oleaginous material and alginic gel-forming material, an emulsifying agent, and certain thermoplastic substances, including thermoplastic isomers of rubber such as described herein.

The principal object of the present invention is to provide a composition having advantageous physical properties which make it particularly useful in the preparation of dental impressions, particularly in having increased strength, resiliency and cohesion in its solidified state, high plasticity and cohesion in its plastic state, and the property of expanding during chilling whereby greater compression of gum tissues is obtained in the taking of impressions as the material passes from plastic to solidified condition.

A further object of the invention is to provide an impression material having advantageous resilient characteristics which possesses the property of breaking or fracturing when subjected to a deforming stress in excess of the elastic limit thereof. A further object of the invention is to provide a resilient impression material reinforced by an elastic filamentous material, such as, vulcanized rubber filaments or threads, incorporated therein, whereby such reinforcing material is caused to be resiliently deformed upon deformation of the body material.

A further object of the invention is to provide an impression material having a reversible gel-forming hydrocolloid as a base and adapted for the molding of models from plaster of Paris or the like, provided with a highly advantageous electrolyte material adapted to hasten the setting of such plaster of Paris upon contact thereof with such impression material, which electrolyte material is at the same time neutral in effect upon the gel-forming hydrocolloid. For this use an alkali-metal sulphate such as potassium sulphate has been found to be particularly advantageous.

An important object of the present invention is to provide a dental impression material which may be brought into contact with the teeth and gums in a plastic state and which may be removed from the teeth as an integral, non-plastic body even in cases in which the teeth are disposed at angles forming undercuts, inverted wedges or dove-tails, such as are sometimes formed by the extraction of a tooth and the inward crowning of adjacent teeth. In this same connection, the material of the present invention provides for accurate and faithful reproduction of the marginal portions of the gum tissue, and for this reason one of the important objects of the invention is to provide a material which expands during the solidification thereof so that, due to such expansion, the material crowds against such gum tissue and compresses the same so that an impression of the tissues is obtained with such tissues in slightly compressed condition.

A further object of the invention is to provide a dental impression material which is easily and cheaply compounded, which will not deteriorate upon standing, and which is not damaged by exposure to temperature below the freezing point of water.

Previously suggested types of dental impression material have been of a more or less wax-like nature or have consisted of a more or less gelatinous material provided with certain constituents to increase the body and decrease the stickiness thereof. Materials of this latter type, containing a relatively large proportion of non-resilient constituents, have relied upon a certain constituent such as rubber for obtaining the desired resiliency of the chilled material. One of the principal objects of the present invention is to provide an impression material having yielding or resilient properties such as above-mentioned, which consists principally of an aqueous gel within which is dispersed a suitable thermoplastic material, and which will soften or become plastic upon heating and which will retain its plastic properties during cooling to a sufficiently low temperature as not to burn or unduly heat the mouth of a patient when placed therein, and which will solidify quickly and at a fairly definite temperature upon chilling, sufficiently to retain the exact shape of the impression after removal from the mouth.

In general, previously suggested impression materials of the general type herein set forth and consisting principally of a suitable aqueous gel, have relied on one material to reduce the stickiness of the gel, another constituent to improve the consistency when in plastic condition, another constituent to improve the strength of the material in chilled condition, certain constituents to improve the development of a "body" prior to and immediately preceding the solidification or chilling thereof, and other materials to improve the resiliency of the mixture. A major distinguishing characteristic of the present invention is that through the use of a single highly advantageous type of thermoplastic material, all the desired attributes of an impression material are obtained at a reduced cost of compounding.

The material of the present invention, in common with the material described in the above-mentioned application Ser. No. 675,461, relies principally upon a single constituent to obtain the desired setting or solidification of the material at a temperature near but below body temperature, such as a gel-forming organic hydrocolloid and particularly a water solution of agar-agar, which will jell out upon cooling to a temperature of approximately 32° C. Other alginic gel-forming materials, such as Irish moss, may be used in some cases, but in general I prefer to use agar-agar, because of its definite setting temperature as a hydro-gel, and its absence of any appreciable tendency to take up additional water after it has once set. In some cases, I may use other reversible gel-forming organic hydrocolloids, such as gelatin, alone or in conjunction with an alginic substance.

As pointed out in the above-mentioned application, the gel-forming material does not possess properties which make it alone sufficient for compounding a dental impression material but I have found that all of the desired characteristics of a dental impression material may be obtained by suitable incorporation of a thermoplastic material of a balata-like type. The term "thermoplastic material" as used herein will be understood to mean a substance which has the property of repeatedly changing from a non-plastic or relatively rigid solidified state to a plastic or fluid state, and back again, upon repeated heating and cooling through a certain temperature range. The present invention is directed principally to the use of an advantageous thermoplastic material of the balata-like type, which is incorporated in the gel-forming material in a highly dispersed condition. The most advantageous type of thermoplastic material for the present use has been found to be a balata-like isomer of rubber, such as may be produced by treatment of rubber, at a suitable temperature and under certain conditions, with sulphuric acid, sulfonic acid or other sulfonic reagent, as described in Industrial and Engineering Chemistry, volume 19, pages 1325-33, December, 1927, and in U. S. patent to Fisher No. 1,605,180, November 2, 1926. These balata-like isomers, having the general formula $(C_5H_8)_n$, are distinguished from rubber in that they are thermoplastic, and of a highly adhesive nature, and are in general superior to balata, particularly in regard to adhesive properties. Due to their greater toughness and strength these products are superior to highly purified balata, and these properties, together with relatively low cost of preparing these materials as compared with the cost of highly purified balata, make the use of these rubber isomers highly preferable.

The type of rubber isomer which I have found to be most useful in the preparation of the present material is described as "type b" on page 1, lines 70-73, in the above-mentioned Fisher patent, and the method of preparation thereof is described particularly on page 2, lines 91 to page 3, line 38 in said patent, that is, examples given as No. 2 and No. 3. This type of thermoplastic has the property of repeatedly changing from a relatively rigid solidified state at body temperature to a plastic state at temperatures above body temperature but below 100° C., and back again, upon repeated heating and cooling, and therefore contributes materially to the development of a "body" in the hydrocolloid composition as the composition approaches its transition from "sol" to "gel" state on cooling. By varying the proportion of the rubber isomer employed with respect to the quantity of water and agar-agar, I am able to quite satisfactorily control the development of a "body" in the material immediately preceding the solidification of the agar-agar. I have found that variation in the quantity of such isomer does not materially affect the actual solidification temperature, but merely makes a change in the above-described "body".

In general, I prefer to prepare my impression material as follows:

From 20 to 40 ounces of gel-forming hydrocolloid, such as agar-agar, are dissolved in approximately three gallons of hot water, preferably by boiling, after which from 5 to 9 fluid ounces of glycerol are added. I then prepare a solution of a thermoplastic balata-like rubber isomer of the type above-described, in a suitable solvent such as benzol or carbon tetrachloride. The solvent should have a boiling point sufficiently lower than that of water to permit complete evaporation thereof from the mixture, and the concentration of the solution should be such as to permit spraying or atomization thereof. This rubber isomer solution is then added to the agar-agar solution in such amount as to provide from 1 to 3 per cent of such rubber isomer on the weight of water and agar-agar present. The isomer solution is preferably added slowly, as by spraying or atomizing the solution into a strongly agitated agar-agar mixture, a very little at a time over a relatively long mixing period.

The mixture of water, agar-agar and glycerol may be kept at a temperature in excess of 80° C. and preferably in the neighborhood of 100° C., and under conditions of violent agitation, and the solution of balata-like rubber isomer sprayed into the aqueous mixture, at the rate of, for example, one-half to three-fourths ounce per minute, over a period of from two to six hours.

Upon contact of the highly dispersed isomer solution with the heated aqueous mixture, the benzol or other solvent is evaporated and the rubber isomer is taken up by the aqueous mixture in highly dispersed state. In general, the rubber isomers of the type above-described have a softening point below 100° C. and due to this fact the rubber isomer particles will remain in softened condition during further agitation of the mass. With the rubber isomer in this softened condition a considerable quantity of moisture is taken up or absorbed thereby, under the above compounding conditions an amount of moisture equal to or somewhat in excess of the weight of isomer being taken up by such isomer, which causes an important modification in the physical properties of these isomer particles, particularly in increasing the plasticity and resiliency, and lowering the softening temperature thereof.

The softened particles of thermoplastic material, particularly after the above-mentioned moisture absorption, are quite unlike raw balata or the raw isomer in that they are highly resilient, and are quite unlike rubber in that they have highly adhesive properties which materially effect the cohesion properties of the finished impression material. At the same time, the above-mentioned rubber isomer, when compounded as above described, is greatly superior to balata, even though balata will act to pick up moisture in much the same manner as does the rubber isomer. The hydrated rubber isomer particles are of a vastly greater adhesive nature than are hydrated balata particles, and it is this property which appears to make possible the use of but a single thermoplastic constituent in a gel base as above described, and obtain a greatly superior impression material, and also makes it unnecessary to use other ingredients to modify and improve the properties of the material for impression use.

The use of a balata-like thermoplastic such as herein described materially increases the strength of the impression composition. The hydrated thermoplastic material is very tough and resilient, and a very considerable bond is established between the individual thermoplastic particles and the matrix of agar-agar gel which causes the properties of the composite material to be materially modified. For example, a gel of agar-agar has a very low tensile and compressive strength and is quite friable. The use of a tough, resilient, thermoplastic material which forms a strong bond with the agar-agar gel matrix produces a much greater effect on the properties of the composite material than can be obtained by the use of a material, such as unvulcanized rubber, which does not bond to any appreciable extent with the hydrocolloid gel, and thus the addition of other modifying constituents is unnecessary.

After addition of the rubber isomer, I prefer to add a suitable amount of plaster-hardening agent, in the event that the impression material is to be used in molding with plaster of Paris or the like. Numerous plaster-hardening agents have been previously suggested in connection with an impression material having a reversible gel-forming hydrocolloid base, such as alum, tannic acid or the like, but it has been found that these customary plaster-hardening agents have in some cases a very deleterious effect upon the gel-forming hydrocolloid, particularly if such agent is used in an amount calculated to give a quite accelerated hardening of the plaster. These plaster-hardening agents cause the gel-forming hydrocolloid to persist in the sol condition at a temperature below the temperature at which they normally pass into the gel condition, thus ruining the material for impression use. I accordingly prefer to use as a plaster-hardening agent an electrolyte which will not materially alter the pH value of the sol and which has no deleterious effect on the hydrocolloid material, and I have found that sulphates of the alkali metals (potassium, sodium, lithium, et cetera) are highly advantageous. For the above mixture, therefore, I prefer to add from 3 to 9 ounces of an alkali metal sulphate. The use of the presently disclosed advantageous type of plaster hardening agent in an impression material having a reversible gel-forming organic hydrocolloid base is specifically described in my co-pending application Ser. No. 44,999, filed Oct. 14, 1935.

In addition to the above ingredients I prefer to add a suitable amount of a satisfactory flavoring material, such as oil of wintergreen. I also prefer to add a small amount of a bactericidal agent, such as menthol, guaiacol or hexylresorcinol.

As a specific example, the proportions of the several ingredients used may be as follows:

3 gallons water (390 parts),
30 ounces agar-agar,
7 fluid ounces glycerol,
8.5 ounces rubber isomer, in the form of a 6% solution in benzol,
6 ounces potassium sulphate,
2 drams oil of wintergreen,
½ ounce menthol.

By addition of the thermoplastic material in the above-described manner, under conditions of violent agitation of the hydrocolloid mixture, the benzol or other solvent is evaporated and the thermoplastic isomer is distributed throughout the mass in a highly dispersed state with but few if any of the isomer particles being greater than approximately 25 microns in diameter and a considerable proportion of the isomer being present in sub-microscopic or ultra-microscopic proportions.

A suitable quantity of vulcanized rubber threads, for example about 1 to 2 per cent of the total weight of the other ingredients used, may be incorporated in the mixture after incorporation of the balata-like rubber isomer, as described in the above-mentioned application. These threads may advantageously be prepared by rolling up a thin sheet of vulcanized rubber and then cutting off thin slices so that the threads will be of 0.01 inch or less in diameter, and preferably 0.005 inch or less, or they may be prepared in any other suitable manner. The threads are preferably added in short lengths such as from one-half to one and one-half inches long.

As described in the above-mentioned application Ser. No. 675,461, these rubber threads or filaments may, if desired, be prepared by extruding raw rubber threads through fine apertures or nozzles into contact with suitable vulcanizing agents such as, for example, a solution of $S_2Cl_2$ or $SCl_2$ or first into a vapor of $SO_2$ and then into a vapor of $H_2S$. These vulcanized rubber filaments may be incorporated in the finished material before such material has cooled out of its sol condition and the addition of such elastic threads has been found to contribute materially to the strength and resistance to permanent deformation of the material. The material of the present invention which includes resilient rubber threads as above set forth is not to be confused with previously disclosed compositions containing unvulcanized rubber in the form of threads or the like, for the reason that such compositions required the use of additional fibrous or filamentous materials to obtain the desired strength, as the raw rubber did not possess the desired properties of strength and resilience such as are possessed by vulcanized rubber threads. The use of vulcanized rubber threads as herein described does not detract from the characteristic exhibited by the material of breaking or rupturing upon application of stress such as to deform the material beyond its ability to return to its original position, as the material, while holding together, will break and show fine surface cracks sufficient to warn the user.

In addition to the above constituents, certain waxes may be added if desired to increase the body consistency of the material immediately preceding solidification thereof, such as beeswax, ceresin, paraffin, vegetable waxes, et cetera. Other ingredients such as resin or resinous gum may be added for the purpose of toughening or increasing the rigidity of the solidified material, but in general, I have found that substantially all the desired properties of an impression material are produced without the addition of the above-mentioned waxes, resins and the like.

During the above-mentioned incorporation of the thermoplastic rubber isomer, considerable water is evaporated from the mixture, and the temperature maintained during compounding and the duration of compounding are preferably so adjusted that the final mixture, starting with the proportions given in the above specific example, weighs approximately 15 pounds and consists substantially as follows:

11 to 12 pounds of water,
30 ounces of agar-agar,
Approximately one-half pound of glycerol,
Three-eighths pound $K_2SO_4$, and
Approximately one-half pound of thermoplastic rubber isomer.

The above composition is ready for immediate use when cooled to a suitable temperature for application to the mouth or may be poured into a mold and allowed to solidify. The material may be formed into suitable shape and coated with a cellulosic material or placed in an airtight container, and may be stored for an indefinite length of time without deterioration. According to a preferred procedure, a molded body of the above material, in solidified or "jelled" condition, of cylindrical or any other suitable shape, may be dipped in a solution of a suitable cellulose compound adapted to form, upon evaporation of the solvent, a thin continuous coating over the surface of the molded body substantially impermeable to air and moisture. For this purpose I may use, for example, a solution of celluloid or cellulose acetate composition in ethyl acetate, of suitable concentration, and the dipping may be carried out by inserting a wire into the molded body, dipping the same by means of said wire into said solution, removing the same therefrom, allowing the coating to partially dry, removing the wire, and then applying a small quantity of the same solution to the opening through which the wire was drawn, and allowing the entire coating to thoroughly dry. This particular method of packaging a hydrocolloid impression composition is more fully described and claimed in my co-pending application Ser. No. 1,744, filed Jan. 14, 1935.

The completed material is solid at ordinary temperatures, but has a certain yielding or resilient property which enables impressions formed therefrom to be removed from the teeth under conditions such as above-mentioned, even after chilling to atmospheric temperature or below. At such temperatures, however, the material is not readily susceptible to permanent deformation at ordinary stresses and is adapted to return to its original position when any normal stress causing resilient deformation thereof is removed. If, however, an excessive deforming force is exerted upon the material, permanent deformation will be accompanied by fracture or rupture, which will be apparent at the surface of the material and thus warn the user that the impression has been damaged. The material has a good property of cohesion at all temperatures at which it is to be used and has a satisfactorily tenacious body or consistency which causes it to hold together while making impressions and after removal thereof from the teeth.

The material or composition is of such a nature that solidification or setting is obtained through a relatively narrow temperature range, so that the material does not have to be cooled for an excessively long time after an impression is made, to insure complete solidification. The body-development range may be confined to about 5° C. Upon being suitably heated above the solidifying temperature the material softens and becomes readily plastic and adapted to flow under pressure and fill all recesses, crevices, and small indentations in the teeth and gums when pressed into engagement therewith. Furthermore, the material is not sticky and can be pressed into position with the fingers without showing any tendency to stick to the fingers and thus be pulled away from the teeth or gums upon removal of the fingers. This material in its preferred form has a chilling time through its body-development range, of from about 1 to 5 minutes, upon application of ordinary cool water at about 15 to 30° C.

It has been found that the material of the present invention, when rapidly chilled through its body-development range, will expand to a marked degree. This expansion is highly advantageous for the reason that as the plastic material is pressed into engagement with the teeth and gums during the molding operation, it is very difficult to obtain an intimate contact with the gum tissues due to the somewhat resilient and spongy nature of such tissues. During or immediately preceding solidification of the plastic material the expansion thereof forces the material into forcible continued contact with the gum tissues, which contact is increased as rigidity is developed in the molding mass. This causes the gum tissue to be compacted and a very tight fit is obtained so that subsequently prepared plates or the like will have a close bearing on these gum tissues which makes the plate more comfortable for the user after it has been in the mouth for a sufficient time to allow the tissues to harden.

The method of using this material is, in general, similar to the use of impression materials now in common use. The material is preferably softened or rendered plastic by placing a quantity thereof in a suitable container and placing the container in cold water, and bringing the water to a boil in about four or five minutes. The material may then be removed from the water and is sufficiently soft and plastic throughout to permit it to be placed in the usual tray or mold and inserted in the mouth and pressed against the teeth and gums in the usual manner. At the time the material is actually inserted in the mouth, the temperature thereof may be about 40° C. or slightly higher. The compound is pressed firmly into contact with the teeth and gums and is then permitted to cool.

After solidification, the material is no longer subject to plastic deformation but may be resiliently deformed for removal so that it will yield sufficiently to permit undercut, wedged, or dovetailed portions thereof to be easily removed from the mouth and to then spring back to their original position, but is subject to rupture if overstressed, as above described. After removal from the mouth, it may be used for the casting or molding of reproductions in plaster or other material. The material is of such nature as to produce very clean-cut reproduction and to produce extremely smooth surface casts in plaster or other material. Even in this state, however, the material has a certain amount of resiliency and ability to yield, which property may be advantageous for certain purposes. For example, this permits the impression to be more easily removed from the cast or reproduction formed therewith so that the impression may be preserved for further use. Also, it facilitates removal of the impression from the tray or from the plate of an articulator or other apparatus with which it may be used.

It has been found that a composition prepared as above described is not subject to damage by exposure to freezing temperatures (below 0° C.) inasmuch as it may, even after exposure to such freezing temperatures, be heated to softening temperature for use without diminution of its favorable characteristics. In view of this property, no extraordinary precautions are necessary in regard to storing or shipping the material.

I claim:

1. An impression material comprising an aqueous organic hydrocolloid gel base and a balata-like thermoplastic material, and containing resilient vulcanized rubber filaments distributed therein.

2. An impression material comprising a reversible organic gel-forming hydrocolloid base and containing resilient vulcanized rubber filaments.

3. A resilient impression material adapted to become plastic upon heating and containing resilient vulcanized rubber filaments distributed therein.

4. A dental impression material having the property of being a resilient solid gel at temperatures adjacent body temperature and a plastic sol at temperatures somewhat above body temperature but below 100° C., and containing as its principal constituent a base material consisting of a reversible organic hydrocolloid modified by a balata-like thermoplastic material incorporated therein in intimate mixture, said thermoplastic material having the property of repeatedly changing from a relatively rigid solidified state at body temperature to a plastic state at temperatures above body temperature but below 100° C., and back again, upon repeated heating and cooling.

5. A dental impression material having the property of being a resilient solid gel at temperatures adjacent body temperature and a plastic sol at temperatures somewhat above body temperature but below 100° C., and containing as its principal constituent a base material consisting of a reversible organic hydrocolloid modified by a thermoplastic rubber isomer incorporated therein in intimate mixture, said thermoplastic isomer having the property of repeatedly changing from a relatively rigid solidified state at body temperature to a plastic state at temperatures above body temperature but below 100° C., and back again, upon repeated heating and cooling.

6. A dental impression material having the property of being a resilient solid gel at temperatures adjacent body temperature and a plastic sol at temperatures somewhat above body temperature but below 100° C., and containing as its principal constituent a base material consisting of a reversible organic hydrocolloid modified by a hydrated balata-like thermoplastic material incorporated therein in intimate mixture, said thermoplastic material having the property of repeatedly changing from a relatively rigid solidified state at body temperature to a plastic state at temperatures above body temperature but below 100° C., and back again, upon repeated heating and cooling.

7. A dental impression material having the property of being a resilient solid gel at temperatures adjacent body temperature and a plastic sol at temperatures somewhat above body temperature but below 100° C., and containing as its principal constituent a base material consisting of a reversible organic hydrocolloid modified by a hydrated balata-like thermoplastic rubber isomer incorporated therein in intimate mixture, said thermoplastic isomer having the property of repeatedly changing from a relatively rigid solidified state at body temperature to a plastic state at temperatures above body temperature but below 100° C., and back again, upon repeated heating and cooling.

LAURENCE E. HARRISON.